United States Patent
Singh

(10) Patent No.: US 8,694,478 B1
(45) Date of Patent: Apr. 8, 2014

(54) DETECTION AND CORRECTION OF CORRUPTED OR DANGLING DATA OBJECT HANDLES

(75) Inventor: Sundeep Singh, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 84 days.

(21) Appl. No.: 13/369,736

(22) Filed: Feb. 9, 2012

(51) Int. Cl.
  *G06F 17/30* (2006.01)
(52) U.S. Cl.
  USPC ............ 707/697; 707/687; 707/698; 707/699
(58) Field of Classification Search
  None
  See application file for complete search history.

(56) References Cited

U.S. PATENT DOCUMENTS 8,037,345 B1 * 10/2011 Iyer et al. ............. 714/6.12
2012/0303685 A1 * 11/2012 Ulrich et al. ............ 707/827

* cited by examiner

*Primary Examiner* — Anteneh Girma
(74) *Attorney, Agent, or Firm* — Mahamedi Paradice Kreisman LLP

(57) ABSTRACT

Exemplary embodiments provide various techniques for detecting and correcting corrupted or dangling data object handles. In one example, a method is provided for correcting corrupted data object handles. In this method, a redirector file stored on a first logical data container is accessed. This redirector file includes a forward object handle pointing to a first data object stored on a second logical data container and includes a first checksum of the forward object handle. A second checksum of the forward object handle is determined and a comparison is made between the first and second checksums. If a mismatch is detected, the data objects stored on the second logical data container are scanned to extract backward object handles. A backward object handle can be identified to point back to the redirector file. The forward object handle can then be restored to point to the second data object based on the identification.

21 Claims, 14 Drawing Sheets

DETECTION AND CORRECTION OF CORRUPTED OR DANGLING DATA OBJECT HANDLES

FIELD

The present disclosure relates generally to storage systems. In an exemplary embodiment, the disclosure relates to detection and correction of corrupted or dangling data object handles.

BACKGROUND

Network based storage is a common approach to backing up data, making large amounts of data accessible to multiple users. There are various forms of network storage, including network attached storage (NAS) and storage area network (SAN). In a NAS context, a storage server services file level requests from clients, whereas in a SAN context, a storage server services block level requests. Some storage servers are capable of servicing both file level requests and block level requests.

In general, a clustered storage system is a collection of nodes where each node may host one or more volumes that are linked into a global namespace. In one example of a clustered storage system, data objects are not stored on one volume, but are distributed across multiple volumes. To track all these data objects, a layer of abstraction is provided in a content repository such that instead of directly referencing a particular data object itself, a reference is made to this abstraction layer, which stores information that points to a location of the data object stored on a particular volume.

As a result of this abstraction, data objects within a clustered storage system are generally not referenced by their name provided in a directory namespace. Instead, each data object is assigned a name that is only identifiable by the abstraction layer. In particular, a file system in a clustered storage system uses a data object handle that points to a location of a data object. However, there are often many file system inconsistencies where the data object handle can become corrupted. For example, the data object handle can become corrupted and therefore point to an erroneous data object. Alternatively, the data object handle can point to a file that was previously deleted, thus a dangling data object handle. These file system inconsistencies can therefore lead to the access of incorrect data objects.

SUMMARY

Embodiments of the present invention describe various methodologies for the detection and correction of corrupted or dangling data object handles. Generally, a data object handle is used to refer to some data object. To detect whether a data object handle is corrupted or dangling, a system uses a checksum of the data object handle. In particular, with the creation of a data object, the system generates a checksum of its corresponding data object handle and stores the checksum with the data object handle. The system may then retrieve the data object handle at a later time period upon which a checksum of the retrieved data object handle is redetermined. The system then compares the redetermined checksum with the checksum previously generated. Based on this comparison, the system can identify whether the data object handle has been corrupted after it has been created.

A mismatch of the checksums indicates that the data object handle has been corrupted. Such a corrupted data object handle indicates to the system that the data object handle is pointing to the incorrect data object. As a result, the system can scan each data object stored on all logical data containers to locate the data object that corresponds to the redirector file.

The comparison of the redetermined checksum with the checksum previously generated can also identify dangling data object handles. In this example, a match of the checksums indicates that the data object handle has not been corrupted. Therefore, if the system subsequently accesses a data object referenced by the data object handle, but this data object is no longer available, then this access error indicates to the system that this object handle is pointing to a data object that is no longer available. This can happen when, for example, a data object has been deleted without updating the file system. To correct the dangling data object handle, the system can subsequently delete the entry from the abstraction layer (or the redirector file).

BRIEF DESCRIPTION OF DRAWINGS

The present disclosure is illustrated by way of example and not limitation in the figures of the accompanying drawings, in which like references indicate similar elements and in which.

DESCRIPTION OF EXEMPLARY EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1:
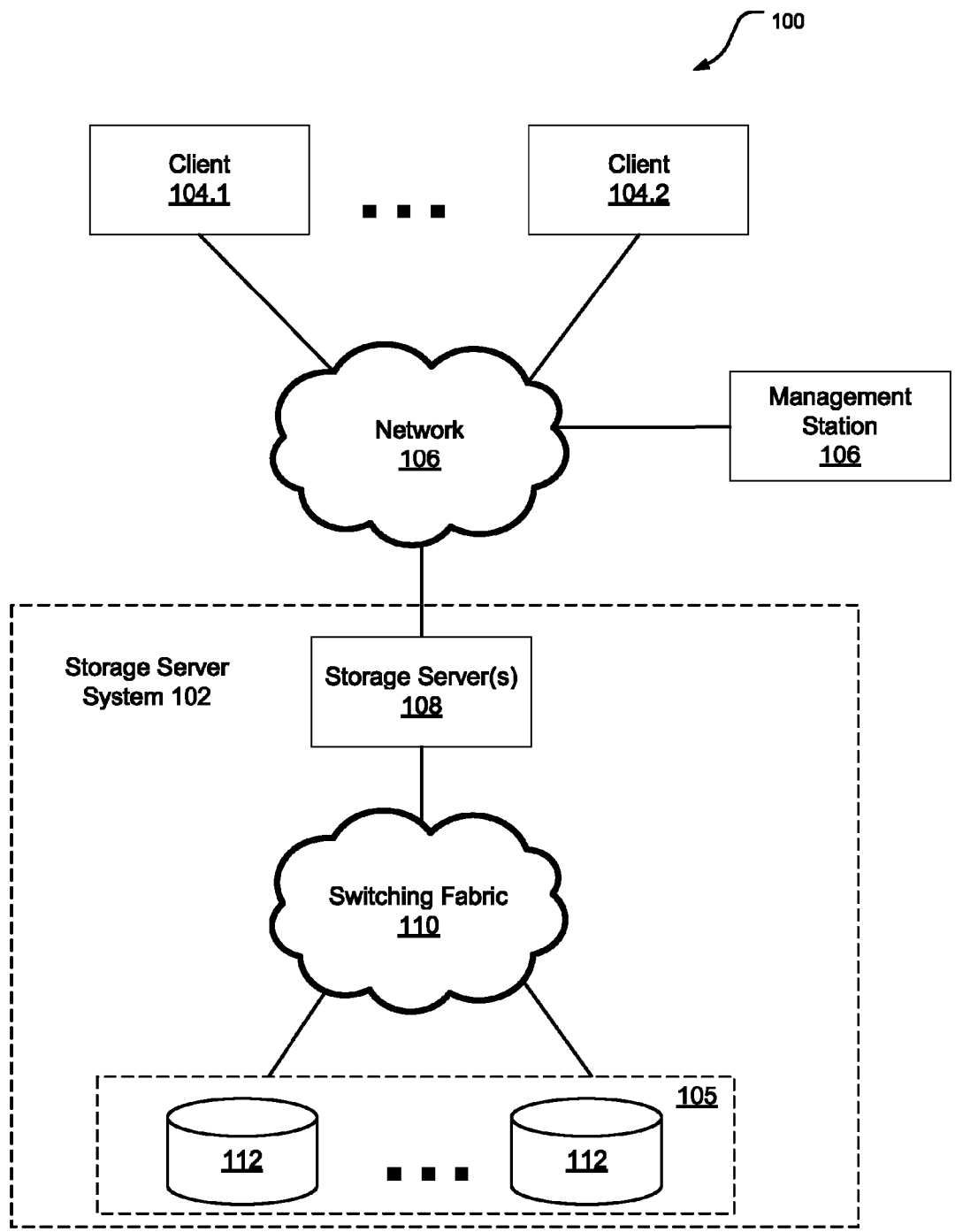
FIGS. 1 and 2 are block diagrams depicting, at different levels of detail, a network configuration in which the various embodiments of the present invention can be implemented.
Figure 2:
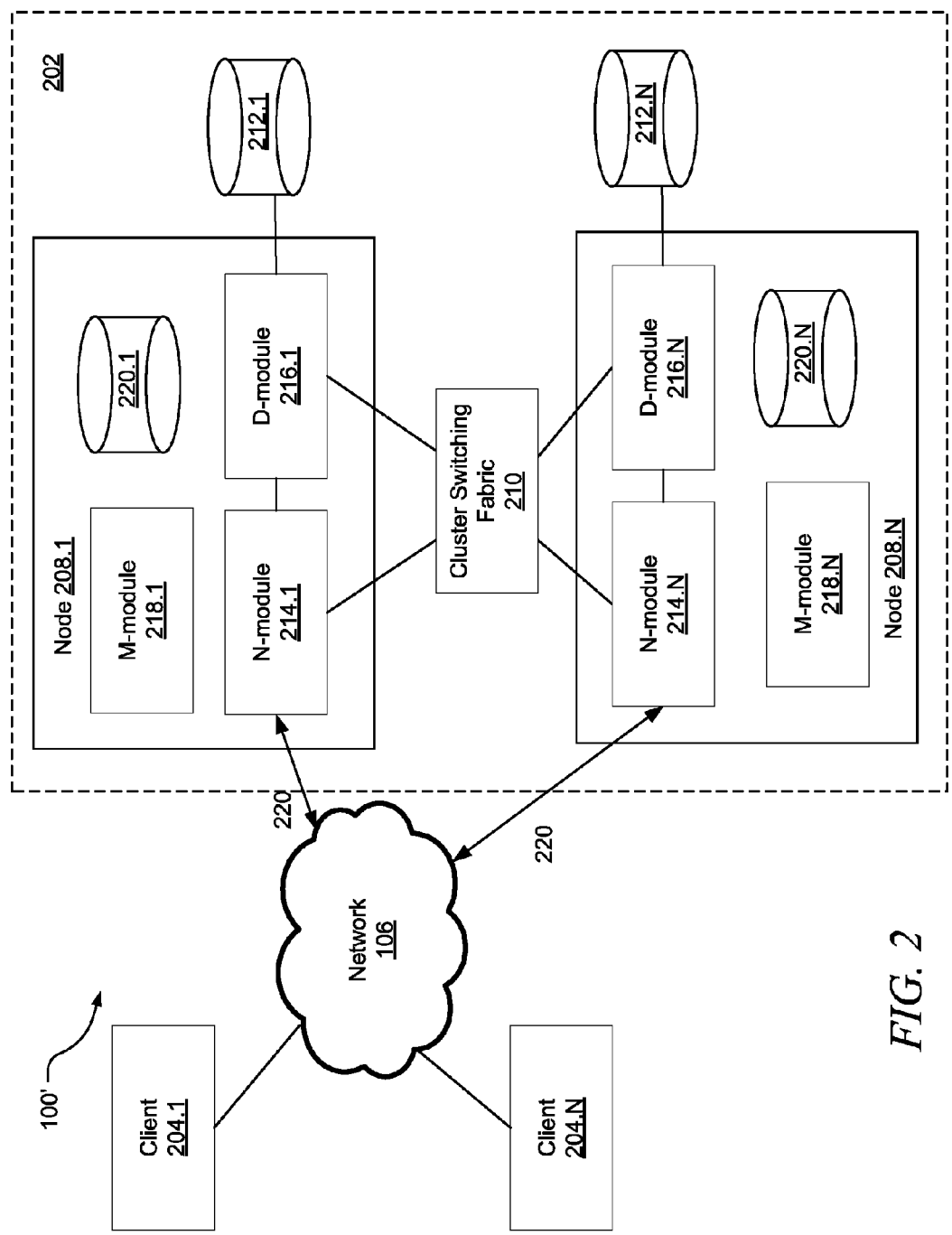

FIGS. 1 and 2 are block diagrams depicting, at different levels of detail, a network configuration in which the various embodiments of the present invention can be implemented. In particular, FIG. 1 is a block diagram depicting a network data storage environment 100, which includes client systems 104.1-104.2, a storage server system 102, and a computer network 106 connecting the client systems 104.1-104.2 and the storage server system 102. The storage server system 102 includes at least one storage server 108, a switching fabric 110, and a number of storage devices 112 in a mass storage subsystem 105. Examples of some or all of the storage devices 112 include hard drives, flash memories, solid-state drives (SSDs), tape storage, and other storage devices.

The storage server (or servers) 108 may be, for example, one of the FAS-xxx family of storage server products available from NETAPP, INC. located in Sunnyvale, Calif. The client systems 104.1-104.2 are connected to the storage server 108 via the computer network 106, which can be a packet-switched network, for example, a local area network (LAN) or wide area network (WAN). Further, the storage server 108 is connected to the storage devices 112 via a switching fabric 110, an example of which can be a fiber distributed data interface (FDDI) network. It is noted that, within the network data storage environment 100, any other suitable numbers of storage servers and/or storage devices, and/or any other suitable network technologies, may be employed. While FIG. 1 implies, in some embodiments, a fully connected switching fabric 110 where storage servers 100 can access all storage devices 112, it is understood that such a connected topology is not required. In some embodiments, the storage devices 112 can be directly connected to the storage servers 108.

The storage server 108 can make some or all of the storage space on the storage devices 112 available to the client systems 104.1-104.2. For example, each storage device 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the storage devices 112 available to users and/or application programs. The storage server 108 can present or export data stored on the storage devices 112 as logical data containers to each of the client systems 104.1-104.2. As used herein, a "logical data container" is an abstraction of physical storage, combining one or more physical storage devices or parts thereof into a single logical storage object, and of which is managed as a single administrative unit, such as a single file system. A volume and a logical unit, which is identifiable by logical unit number (LUN), are examples of logical data containers. A "file system" is a structured (e.g., hierarchical) set of stored logical data containers (e.g., volumes, LUNs, directories, data objects (e.g., files)). As illustrated below, it should be appreciated that a "file system" does not have to include or be based on "files" per se as its units of data storage.

In addition, various functions and configuration settings of the storage server 108 and the mass storage subsystem 105 can be controlled from a management station 106 coupled to the network 106. Among many other operations, operations related to the detection and correction of corrupted or dangling data object handles can be initiated from the management station 106.

FIG. 2 is a block diagram depicting a more detailed view of the network data storage environment 100 described in FIG. 1. The network data storage environment 100' includes a plurality of client systems 204 (204.1-204.N), a clustered storage server system 202, and a computer network 106 connecting the client systems 204 and the clustered storage server system 202. As depicted, the clustered storage server system 202 includes server nodes 208 (208.1-208.N), a cluster switching fabric 210, and storage devices 212 (212.1-212.N).

Each of the nodes 208 can be configured to include several modules, including a networking module ("N-module") 214, a data module ("D-module") 216, a management module ("M-module") 218 (each of which can be implemented by using a separate software module), and an instance of a replicated database (RDB) 220. Specifically, node 208.1 includes an N-module 214.1, a D-module 216.1, and an M-module 218.1. Node 208.N includes an N-module 214.N, a D-module 216.N, and an M-module 218.N. The N-modules 214.1-214.M include functionalities that enable nodes 208.1-208.N, respectively, to connect to one or more of the client systems 204 over the network 106. The D-modules 216.1-216.N provide access to the data stored on the storage devices 212.1-212.N, respectively. The M-modules 218 provide management functions for the clustered storage server system 202. Accordingly, each of the server nodes 208 in the clustered storage server arrangement provides the functionality of a storage server.

The RDB 220 is a database that is replicated throughout the cluster, (e.g., each node 208 includes an instance of the RDB 220). The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each logical data container in the cluster (e.g., the owning D-module 216 for each volume), and is used by the N-modules 214 to identify the appropriate D-module 216 for any given logical data container to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules 214 and D-modules 216 in FIG. 2, there may be differing numbers of N-modules 214 and/or D-modules 216 in accordance with various embodiments of the technique described herein. For example, there need not be a one-to-one correspondence between the N-modules 214 and D-modules 216. As such, the description of a node 208 comprising one N-module 214 and one D-module 216 should be understood to be illustrative only.

Figure 3:
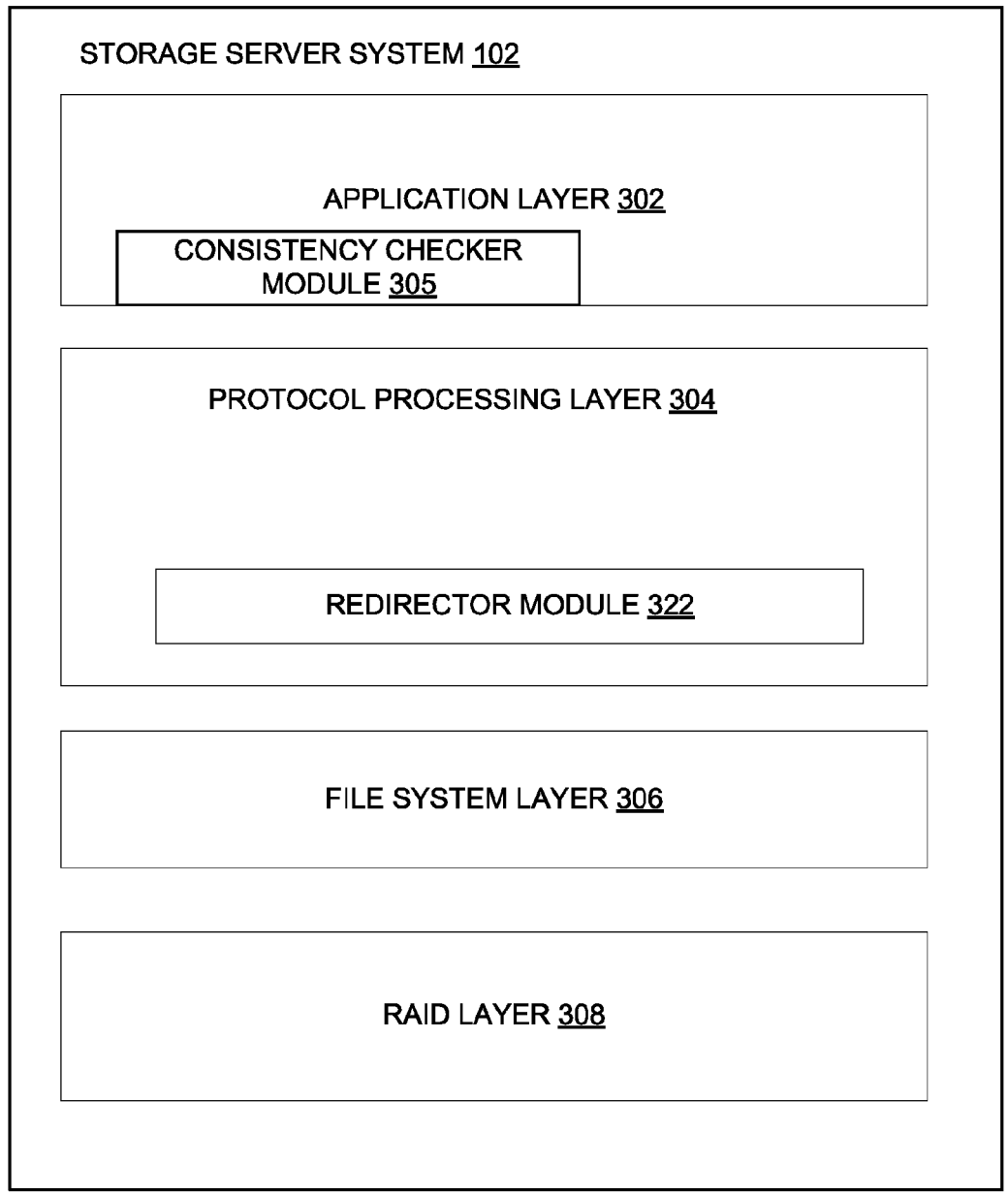
FIG. 3 is a simplified architectural diagram of a storage server system, in accordance with an exemplary embodiment, for identifying data objects stored in clustered logical data containers.

FIG. 3 is a simplified architectural diagram of a storage server system 102, in accordance with an exemplary embodiment, for identifying data objects stored in clustered logical data containers. The storage server system 102 supports a variety of layers 302, 304, 306, and 308 organized to form a multi-protocol engine that provides data paths for clients to access data stored in storage devices. The Redundant Array of Independent Disks (RAID) layer 308 provides the interface to RAID controllers, which distribute data over several storage devices. The file system layer (or file system) 306 forms an intermediate layer between storage devices and applications. It should be appreciated that storage devices are block-oriented storage medias and the file system 306 is configured to manage the blocks used by the storage devices. The file system 306 provides clients access to data objects organized in blocks by way of example directories and files.

The protocol processing layer 304 provides the protocols used to transmit stored data objects, such as Internet Small Computer System Interface (iSCSI), Network File System (NFS), and Common Internet File System (CIFS). In one exemplary embodiment, the protocol processing layer 304 includes a redirector module 322. As explained in detail below, the redirector module 322 is configured to provide indirection between directory entries and storage locations of stored data objects. Additionally included is an application layer 302 that interfaces to and performs common application services for application processes. In one embodiment, the application layer 302 can include a consistency checker module 305 that scans data objects stored on logical data containers to correct corrupted or dangling data object handles, as explained in detail below.

It should be appreciated that in other embodiments, the storage server system 102 may include fewer or more modules apart from those shown in FIG. 3. For example, in an alternate embodiment, the redirector module 322 can be further separated into two or more modules. The modules 305 and 322 may be in the form of software that is processed by a processor. In another example, as explained in more detail below, the modules 305 and 322 may be in the form of firmware that is processed by application specific integrated circuits (ASIC), which may be integrated into a circuit board. Alternatively, the modules 305 and 322 may be in the form of one or more logic blocks included in a programmable logic device (for example, a field programmable gate array). The described modules 305 and 322 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
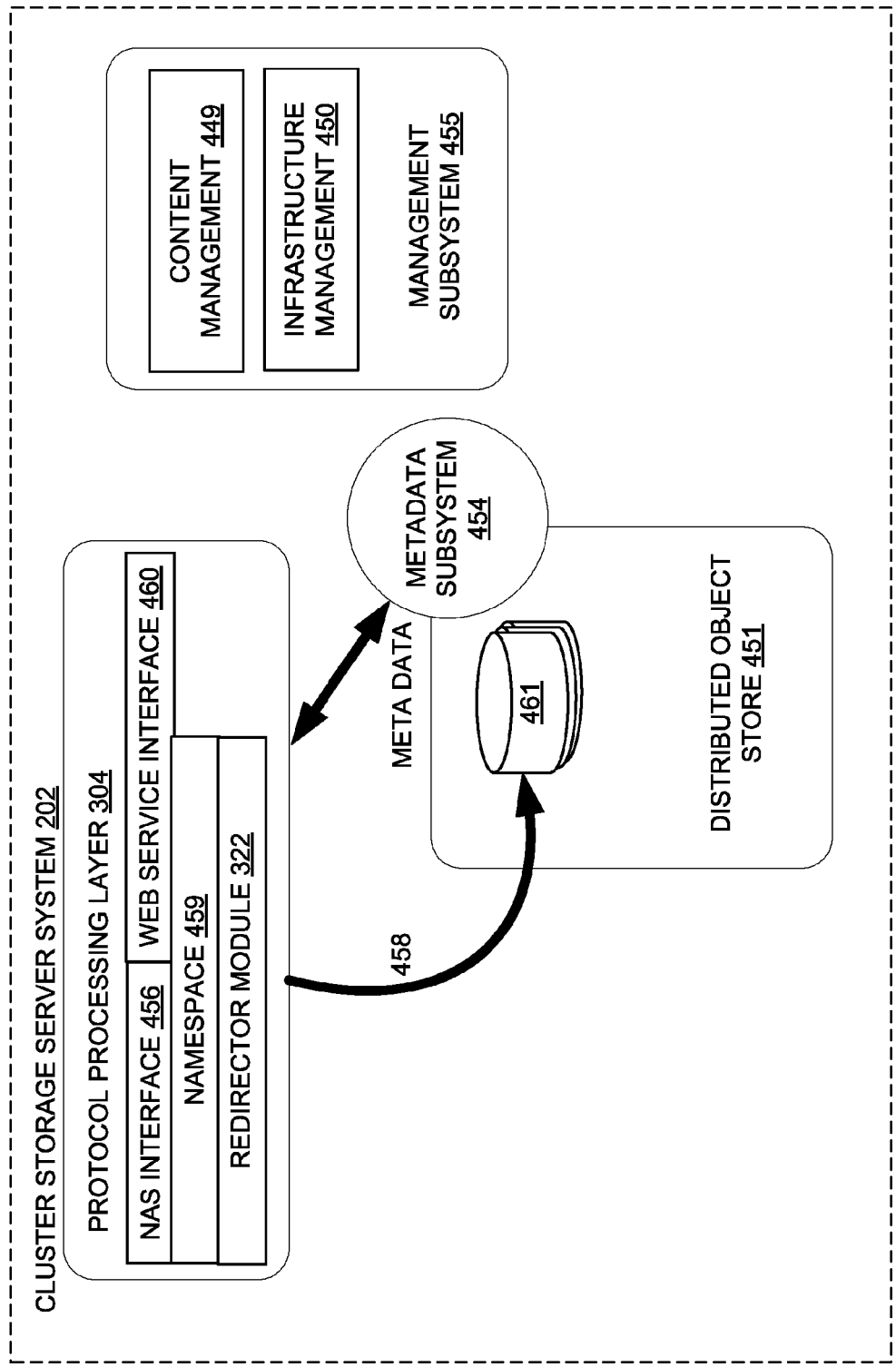
FIG. 4 is a block diagram illustrating an overall architecture of a content repository embodied in a clustered storage server system, according to one exemplary embodiment.

FIG. 4 is a block diagram illustrating an overall architecture of a content repository embodied in a clustered storage server system 202, according to one exemplary embodiment. Components of the content repository include a distributed object store 451, a protocol processing layer 304, a metadata subsystem (MDS) 454, and a management subsystem 455. A single instance of each of these components 451, 304, and 454 can exist in the overall content repository, and each of these components 451, 304, and 454 can be implemented in any one server node or distributed across two or more server nodes in a clustered storage server system 202.

The distributed object store 451 provides the actual data storage for all data objects in the clustered storage server system 202 and includes multiple distinct single-node object stores 461. A "single-node" object store is an object store that is implemented entirely within one node. Each single-node object includes a logical data container. Some or all of the single-node object stores 461 that constitute the distributed object store 451 can be implemented in separate server nodes. Alternatively, all of the single-node object stores 461 that constitute the distributed object store 451 can be implemented in the same server node. Any given server node can access multiple single-node object stores 461 and additionally, can itself include multiple single-node object stores 461.

The distributed object store 451 provides location-independent addressing of data objects with the ability to span the object address space across other similar systems spread over geographic distances. That is, data objects can be moved among single-node object stores 461 without changing the data objects' addressing. It should be noted that the distributed object store 451 has no namespace; the namespace for the clustered storage server system 202 is provided by the protocol processing layer 304.

The protocol processing layer 304 provides access 458 to the distributed object store 451 and essentially functions as a router, by receiving client requests, translating them into an internal protocol and sending them to the appropriate D-module. The protocol processing layer 304 provides two or more independent interfaces for accessing stored data (e.g., a conventional NAS interface 456 and a Web Service interface 460). The NAS interface 456 allows access to the object store 451 via one or more conventional NAS protocols, such as NFS and/or CIFS. Thus, the NAS interface 456 provides a file system-like interface to the content repository. Both the NAS interface 456 and Web Service interface 460 allow access to data stored in the object store 451 by named object access, which uses a namespace 459. This namespace 459 is a file system-like directory-tree interface for accessing data objects. An example of a namespace 459 is a Portable Operating System Interface (POSIX) namespace.

The redirector module 322 in the protocol processing layer 304 generally provides a logical separation of directory entries and storage locations of stored data objects in the distributed object store 451. As described in detail below, the redirector module 322 can also provide the functionalities of identifying data objects stored on the distributed object store 451.

The MDS 454 is a subsystem for search and retrieval of stored data objects, based on metadata. It is accessed by users through the presentation layer 53. The MDS 454 stores data object metadata, which can include metadata specified by users, inferred metadata and/or system-defined metadata. The MDS 54 also allows data objects to be identified and retrieved by searching on any of that metadata. The metadata may be distributed across nodes in the system. In one embodiment where this is the case, the metadata for any particular data object are stored in the same node as the object itself.

The management subsystem 455 includes a content management component 449 and an infrastructure management component 450. The infrastructure management component 450 includes logic to allow an administrative user to manage the storage infrastructure (e.g., configuration of nodes, disks, volumes, LUNs, etc.). The content management component 449 is a policy based data management subsystem for managing the lifecycle of data objects (and optionally the metadata) stored in the content repository, based on user-specified policies or policies derived from user-defined SLOs. It can execute actions to enforce defined policies in response to system-defined trigger events and/or user-defined trigger events (e.g., attempted creation, deletion, access, or migration of a data object). Trigger events do not have to be based on user actions. The specified policies may relate to, for example, system performance, data protection and data security. Performance related policies may relate to, for example, which logical container a given data object should be placed in, migrated from or to, when the data object should be migrated, deleted, or other file operations. Data protection policies may relate to, for example, data backup and/or data deletion. As used herein, a "policy" can be a set of specific rules regarding where to store what, when to migrate data, derived by the system from the end user's SLOs.

Figure 5:
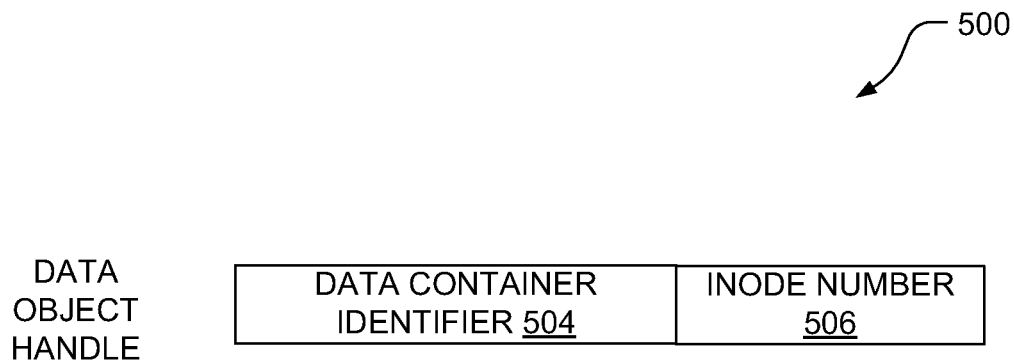
FIG. 5 is a block diagram depicting a data object handle, in accordance with an embodiment of the present invention.

Access to the distributed object store is based on the use of a data object handle, an example of which is illustrated in FIG. 5. In general, a data object handle is used to refer to some data object. In reference to FIG. 5, an exemplary data object handle 500 includes a logical data container identifier 504 and an inode number 506 on that data container. The logical data container identifier 504 is a value that uniquely identifies a logical data container. The inode number 506 identifies a specific inode on the destination logical data container, which in turn stores the addresses of the data blocks for the data object. The inode is a data structure used to store the metadata of one or more data containers. The inode includes a set of pointers to blocks within a file system. For data objects, for example, the inode may directly point to blocks storing the data objects.

Figure 6:
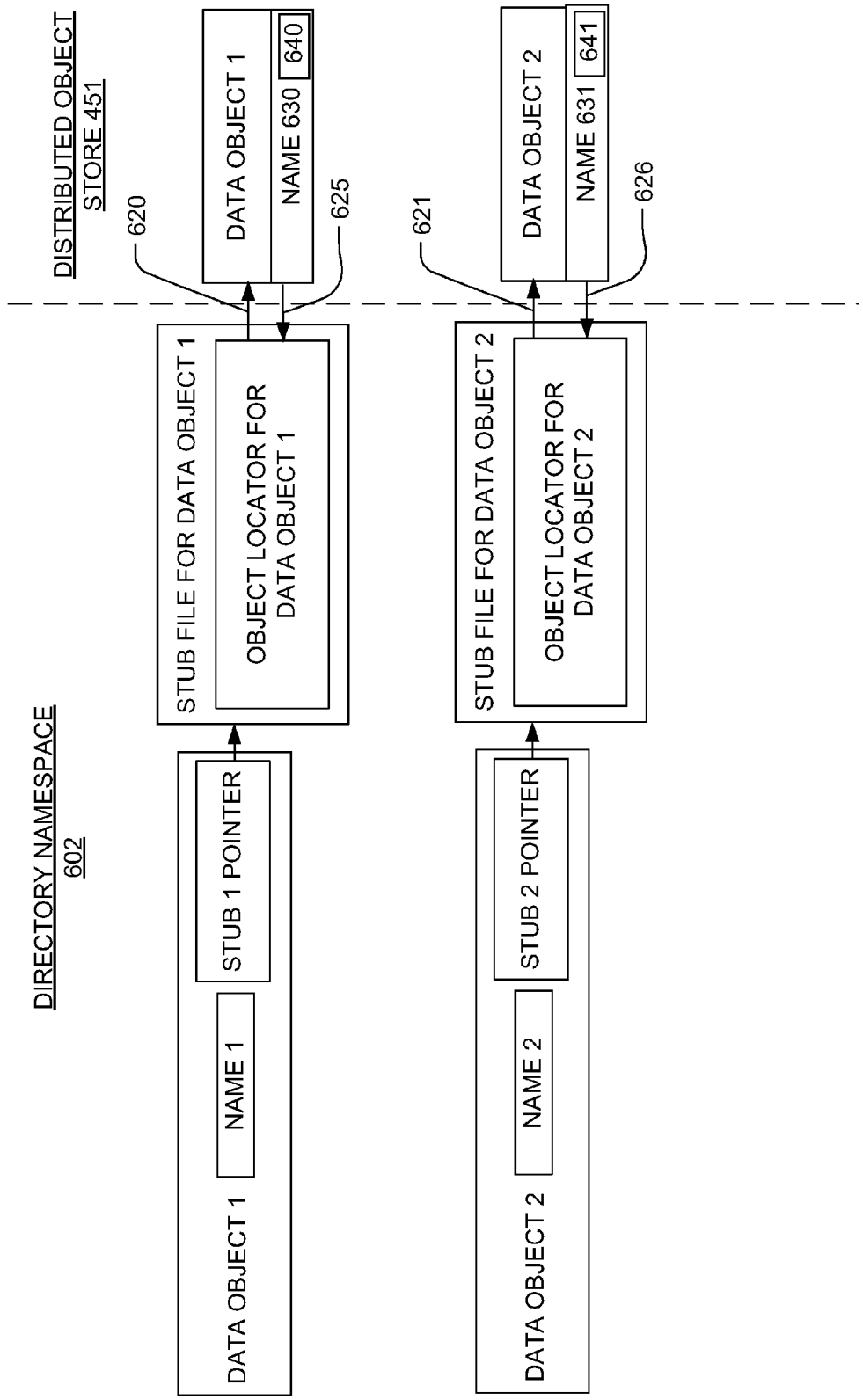
FIG. 6 is a block diagram depicting the referencing of data objects stored in a cluster of logical data containers, in accordance with an exemplary embodiment.

FIG. 6 is a block diagram depicting the referencing of data objects stored in a cluster of logical data containers, in accordance with an exemplary embodiment. As illustrated, path names of data objects in the storage server system are stored in association with a namespace (e.g., a directory namespace 602). Here, each directory entry includes a path name (e.g., NAME 1 or NAME 2) of the data object and a pointer (e.g., REDIRECTOR POINTER 1 or REDIRECTOR POINTER 2) for mapping the directory entry to the data object.

The redirector pointer of each data object points to a redirector file associated with the data object. In the illustrated embodiment, the redirector files are stored within the directory namespace 602. The redirector file for data object 1 includes a forward data object handle 620 that, from the perspective of a client, points to a specific location (e.g., a physical address) of the data object within the distributed object store 451. Similarly, the redirector file for data object 2 includes a forward data object handle 621. Accordingly, a clustered storage server system can map the directory entry of each data object to a specific location of the data object within the distributed object store. By using this mapping, the clustered storage server system can mimic a traditional file system hierarchy, while also being able to provide location independence of directory entries.

In addition, FIG. 6 also shows that names 630 and 631 assigned to the data objects 1 and 2 include backward data object handles 625 and 626 that point back to the redirector files for data objects 1 and 2, respectively. The paths of the redirector files in the directory namespace 602 can be identified by referencing the backward data object handles 625 and 626. In particular, a redirector module can create a data object 1 or 2 on a data constituent logical data container using a newly created redirector handle as a name of the data object. It should be appreciated that a creation of a redirector file results in the creation of this redirector handle. In one embodiment, the name 630 or 631 comprises, in part, the redirector handle along with other metadata, such as a checksum 640 and 641, which is described in detail below. By using the redirector handle as a name of the data object, the redirector handle then becomes a "backward" data object handle 625 or 626 that points from the data object 1 or 2, respectively, stored on the data constituent logical data container (e.g., distributed object store 451) back to the redirector file stored on the namespace logical data container (e.g., directory namespace 602). From the perspective of a client, the backward data object handle 625 or 626 points to a direction (from data object 1 or 2 to redirector file) that is opposite of the "forward" data object handle 620 or 621. Accordingly, an application having access to only the data constituent logical data container can locate the redirector file stored on the namespace logical data container by referencing the backward data object handle 625 or 626.

Figure 7:
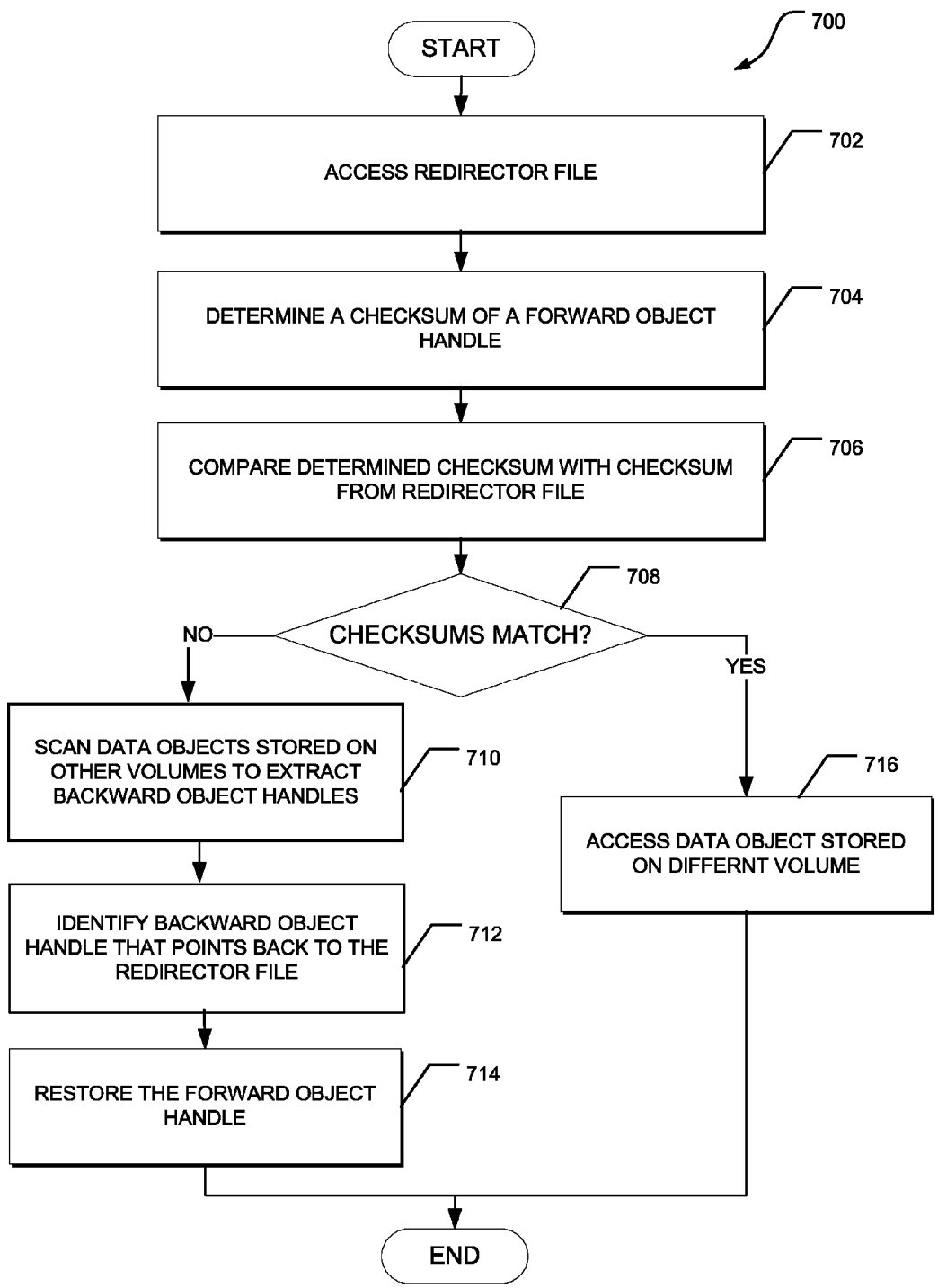
FIG. 7 depicts a flow diagram of a general overview of a method, in accordance with an exemplary embodiment, for correcting corrupted object handles.

FIG. 7 depicts a flow diagram of a general overview of a method 700, in accordance with an exemplary embodiment, for detecting and correcting corrupted data object handles. In one exemplary embodiment, the method 700 may be implemented by the consistency checker module 305 and the redirector module 322 depicted in FIG. 3. In reference to FIG. 7, when a particular data object is referenced, the redirector module, at 702, accesses a redirector file associated with the data object. As discussed above, the redirector file includes a forward object handle that points to the particular data object stored on a different logical data container. In addition, the redirector file also includes a checksum of the forward object handle. As used herein, a "checksum" refers to a fixed-size datum computed from one or more blocks of data. A variety of algorithms can be used to generate a checksum, such as cyclic redundancy check (CRC), longitudinal parity check, Fletcher's checksum, and Adler-32.

After the redirector file has been accessed, the redirector module determines another checksum of the same forward object handle at 704. In other words, the checksum of the forward object handle is redetermined. The checksum of the forward object handle is redetermined in order to detect any potential corruption of the forward object handle. Here, the forward object handle stored in the redirector file might be corrupted. Therefore, at 706, a comparison is made between the checksum determined at 704 and the checksum retrieved from the redirector file to detect whether the forward object handle is corrupted.

As depicted at 708, a match of the checksums indicates that the forward object handle, as stored in the redirector file, has not been corrupted. Therefore, the forward object handle correctly points to the data object stored on a different logical data container. Accordingly, at 716, the redirector module directly accesses the data object stored on the different logical data container.

However, a mismatch of the checksums indicates that the forward object handle, as stored in the redirector file, is corrupted. Accordingly, the consistency checker module, at 710, scans data objects stored on other logical data containers to extract the backward object handles. For example, the consistency checker module can scan all data objects stored on each logical data container to extract the backward object handles that are associated with the data objects. Thereafter, the consistency checker module follows each backward object handle to identify whether the backward object handle points back to the redirector file.

As depicted in 712, the consistency checker module identifies one of the backward object handles that points back to the redirector file, which indicates that the forward object handle originally accessed above did not point to the correct data object located on the different logical data container. Accordingly, the consistency checker module, at 714, restores the forward object handle to point to the correct data object. For example, the consistency checker module can add a new forward object handle or modify the existing forward object handle to point to the data object, which has a corresponding backward object handle that points directly back to the same redirector file. The methodology described in FIG. 7 can be repeated for each redirector file to correct all the corrupted forward object handles stored on a single logical data container.

Figure 8A:
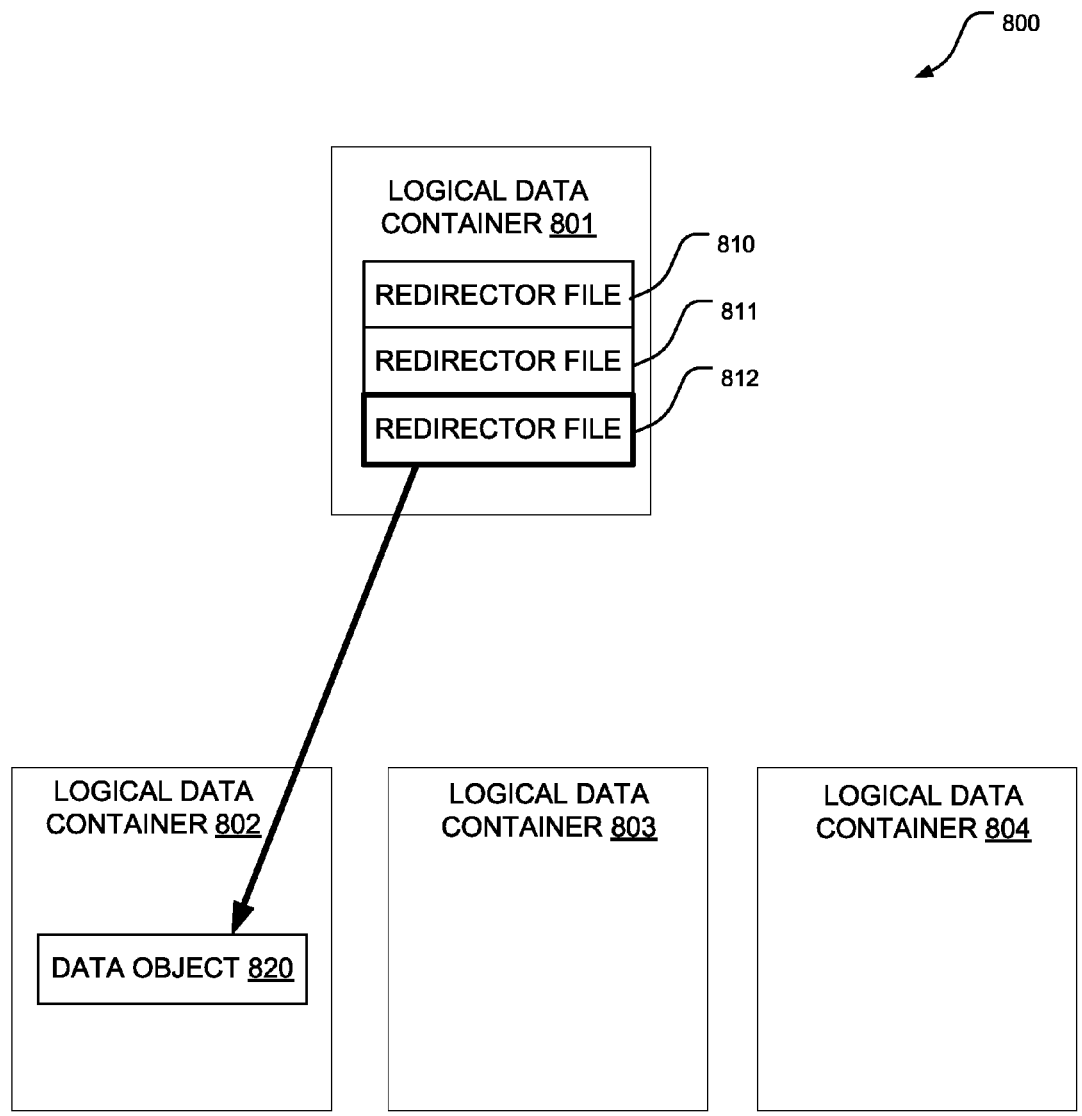
FIGS. 8A-8C depict block diagrams illustrating the correction of a corrupted forward object handle, in accordance with an exemplary embodiment.
Figure 8B:
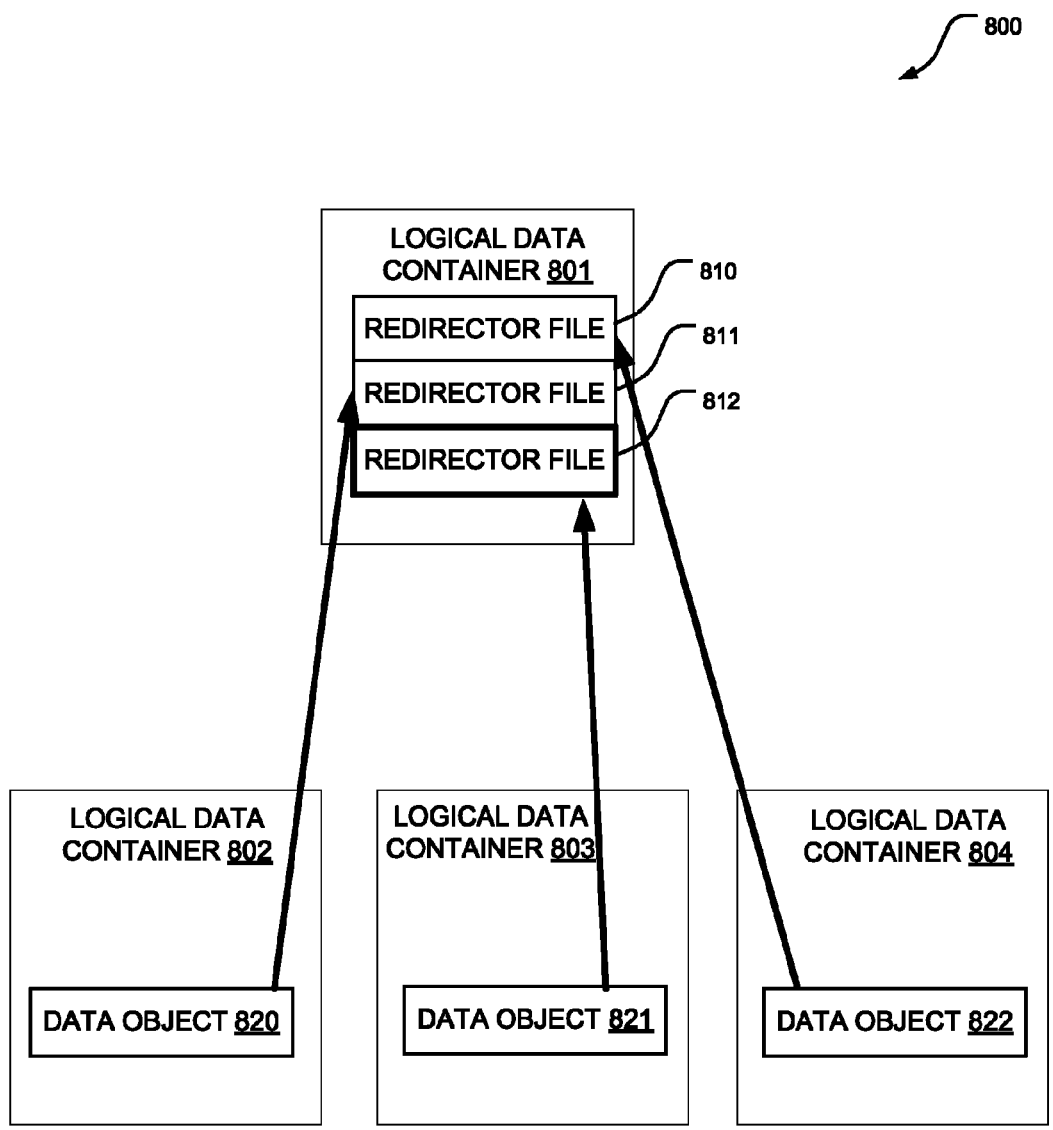
Figure 8C:
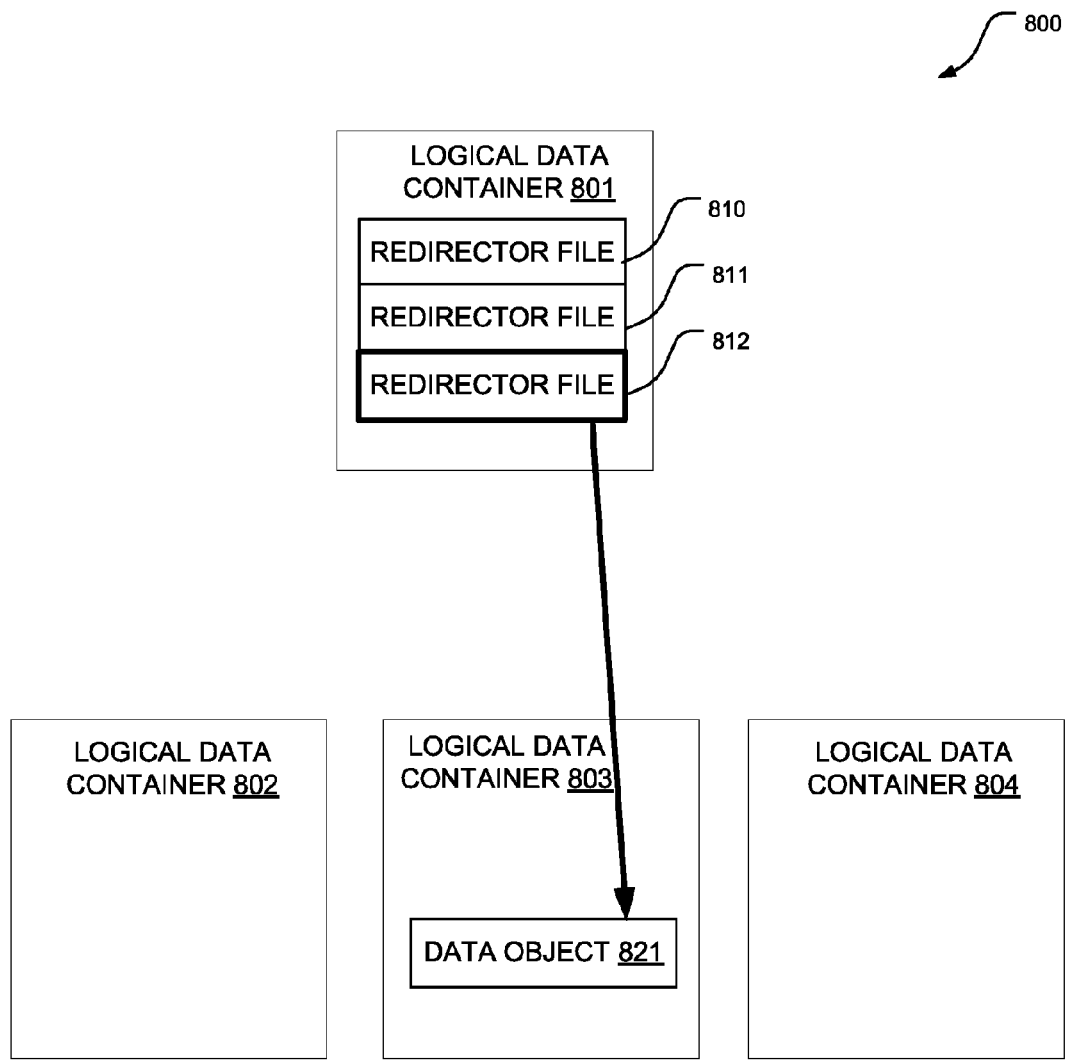

FIGS. 8A, 8B, and 8C depict block diagrams illustrating the correction of a corrupted forward object handle, in accordance with an exemplary embodiment. As depicted in FIG. 8A, the system 800 includes logical data containers 801-804. In this example, logical data container 801 includes a distributed object store that is configured to store multiple redirector files 810-812. Each redirector file 810, 811, or 812 includes a forward object handle that points to a data object stored on one of the three logical data containers 802, 803, or 804. As discussed above, logical data container 801 is not configured to store data objects.

When a data object needs to be accessed, the redirector module accesses a redirector file 812 that is associated with the data object to be accessed. As depicted in FIG. 8A, the redirector file 812 includes a forward object handle that points to a data object 820 stored on logical data container 802. Additionally included in this redirector file 812 is a checksum of the forward object handle.

The redirector module then determines a new checksum of the same forward object handle stored in the redirector file 812, and compares this determined checksum with the checksum retrieved from the redirector file 812. In this example, the redirector module detects a mismatch between the two checksums based on the comparison, thereby indicating that the forward object handle stored in the redirector file 812 has been corrupted. Therefore, the forward object handle is pointing to an incorrect location. That is, the data object 820 referred to by the forward object handle stored in the redirector file 812 is not correct.

As a result, the redirector module can mark this forward object handle stored in the redirector file 812 as being corrupt, and move this forward object handle (or redirector file 812) to, for example, a special directory reserved for corrupted forward object handles to be corrected later by a consistency checker module. For example, as depicted in FIG. 8B, the consistency checker module can later scan every single data object stored on logical data containers 802-804 to extract backward object handles associated with the data objects. For example, the consistency checker module scans data object 820 stored on logical data container 802 to extract its backward object handle and identifies whether it points back to the redirector file 812. In this example, the backward object handle associated with the data object 820 points back to redirector file 811. The consistency checker module then scans data object 822 stored on logical data container 804 and follows its backward object handle back to redirector file 810. Similarly, the consistency checker module scans the data object 821 stored in logical data container 803 to identify that the backward object handle actually points to the redirector file 812, which has been previously determined that its forward object handle has been corrupted. As depicted in FIG. 8C, upon detection that the data object 821 stored on logical data container 803 actually points back to the same redirector file 812, the consistency checker module restores the forward object handle included in the redirector file 812 to point to the correct data object 821 stored in logical data container 803.

The consistency checker module then, in one embodiment, redetermines a checksum of the restored forward object handle, which points to data object 821, and then inserts the redetermined checksum into the redirector file 812 such that this checksum can be used again to detect possible corruption of the redirector file 812 in the future. The correction of corrupted object handles can be repeated for each corrupted redirector file.

Returning to FIG. 8B, it should be appreciated that it is conceivable that the consistency checker module may not identify any data object (e.g., data objects 820-822) stored on logical data containers 802-804 that points back to the redirector file 812. In this example, the consistency checker module can delete the forward object handle (or redirector file 812).

Figure 9:
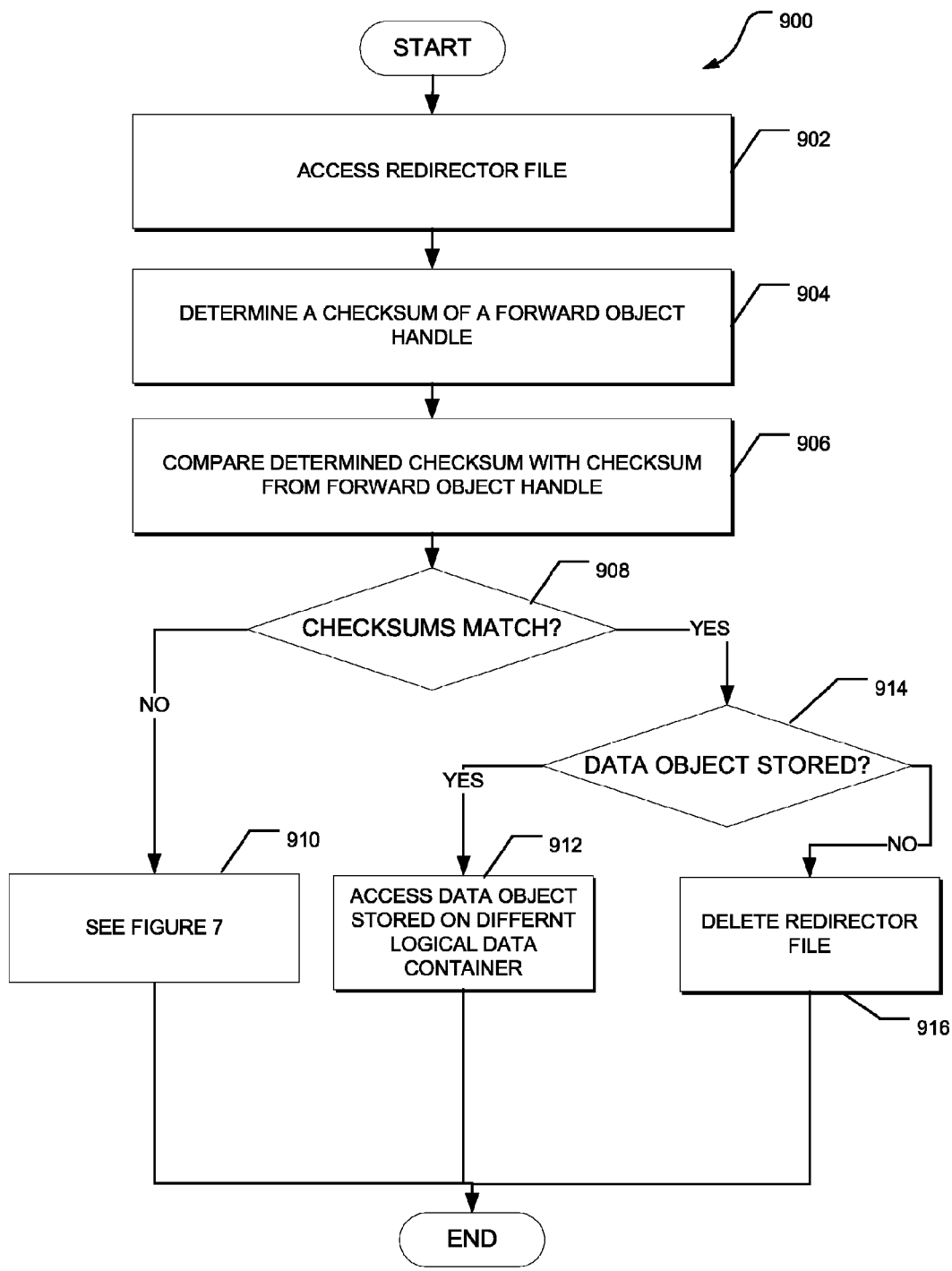
FIG. 9 depicts a flow diagram of a general overview of an alternate method, in accordance with another exemplary embodiment, for correcting dangling object handles.

FIG. 9 depicts a flow diagram of a general overview of an alternate method 900, in accordance with another exemplary embodiment, for detecting and correcting dangling object handles. In one exemplary embodiment, the method 900 may be implemented by the consistency checker module 305 and the redirector module 322 depicted in FIG. 3. Referring to FIG. 9, when a particular data object is to be referenced, the redirector module accesses a redirector file, at 902, that is associated with the requested data object. From this redirector file, the redirector module can access a forward object handle and a checksum of the forward object handle. The redirector module then determines, at 904, a checksum of the extracted forward object handle and, at 906, compares this determined checksum with the checksum retrieved from the redirector file. If the checksums do not match, as indicated in at 908 and 910, then the methodology described in FIG. 7 can implemented to correct the corrupted forward object handle.

However, if the checksums match, then the redirector module, at 914, detects whether the data object referenced by the forward object handle is stored in the referenced logical data container. The detection of whether a data object is stored on a particular logical data container can be detected by accessing the data object based on the pointer included in the forward object handle and receiving an access error if the data object is not located at a location referenced by the forward object handle.

As indicated at 912, if the data object is stored in the referenced logical data container, then the redirector module simply accesses the data object stored on the referenced logical data container. However, if the data object is not stored at a location indicated by the forward object handle, then it indicates that the referenced data object is no longer available. This can happen when a particular data object has been deleted, but the file system (and its redirector file) has not been updated accordingly. However, the forward object handle included in the redirector file is correct because the checksums match. Thus, the forward object handle is not corrupt and the consistency checker module can delete the redirector file at 916. The methodology described in FIG. 9 can be repeated for each redirector file to clean up all the redirector files with forward object handles that erroneously point to data objects that have been deleted, these forward object handles of which can be referred to as "dangling" forward object handles.

Figure 10A:
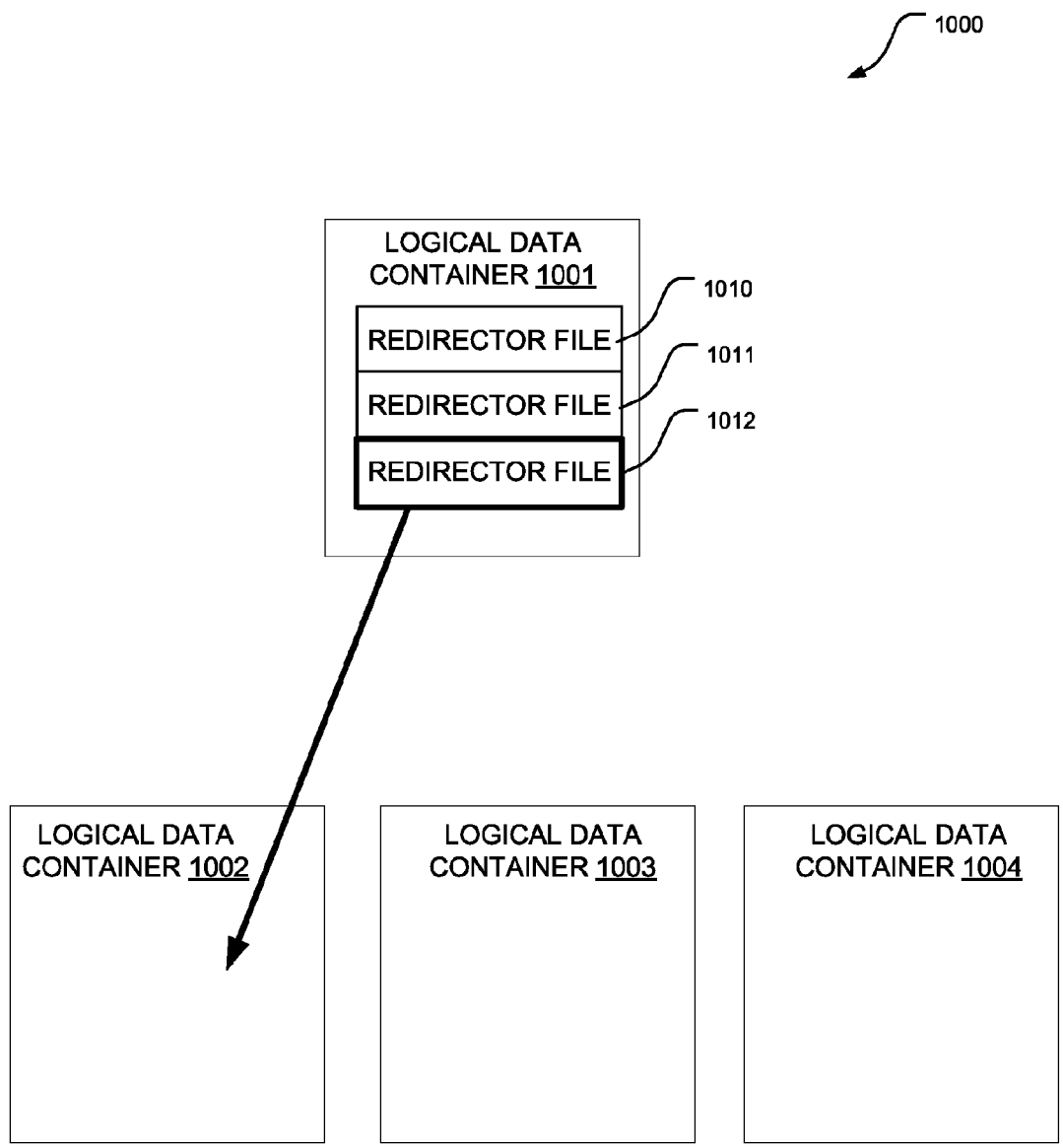
FIGS. 10A and 10B depict block diagrams illustrating the correction of dangling object handles, in accordance with an exemplary embodiment of the present invention.
Figure 10B:
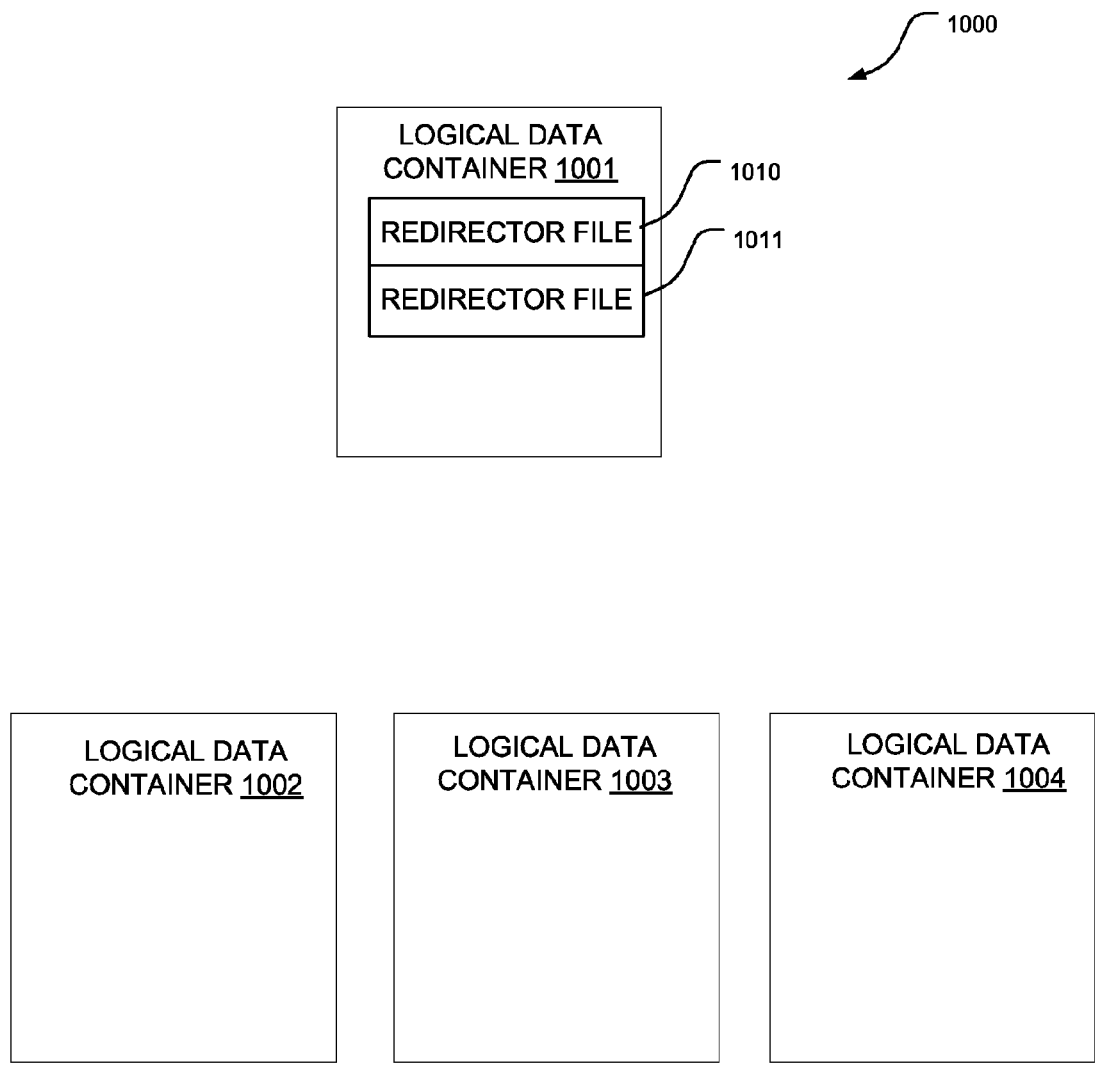

FIGS. 10A and 10B depict block diagrams illustrating the correction of dangling object handles, in accordance with an exemplary embodiment of the present invention. As referenced in FIG. 10A, the system 1000 of logical data containers 1001-1004 includes logical data container 1001 that includes a distributed object store configured to store multiple redirector files 1010-1012. Again, this logical data container 1001 is not configured to store data objects. Instead, the data objects are stored in logical data containers 1002-1004. To correct a dangling object handle, the redirector module initially accesses redirector file 1012, which includes a forward object handle that points to a location on logical data container 1002 and additionally includes a checksum of the forward object handle. The redirector module then determines a checksum of the forward object handle stored in the redirector file 1012 and compares this redetermined checksum with the checksum included in the redirector file 1012.

Here, the redirector module detects a match between the checksums and as a result, this match indicates that the forward object handle included in the redirector file 1012 has not been corrupted. The redirector module then detects whether the data object referenced by the forward object handle is stored in logical data container 1002 simply by accessing the data object based on the forward object handle. In this example, the redirector module receives an access error from the file system, thereby indicating that the referenced data object no longer exists on logical data container 1002. Given that the redirector module already identified that the forward object handle is not corrupt, this access error indicates that the referenced forward object handle is dangling, and that it references a data object that is no longer stored on logical data container 1002. As depicted in FIG. 10B, the consistency checker module can therefore delete the redirector file 1012 from logical data container 1001.

Figure 11:
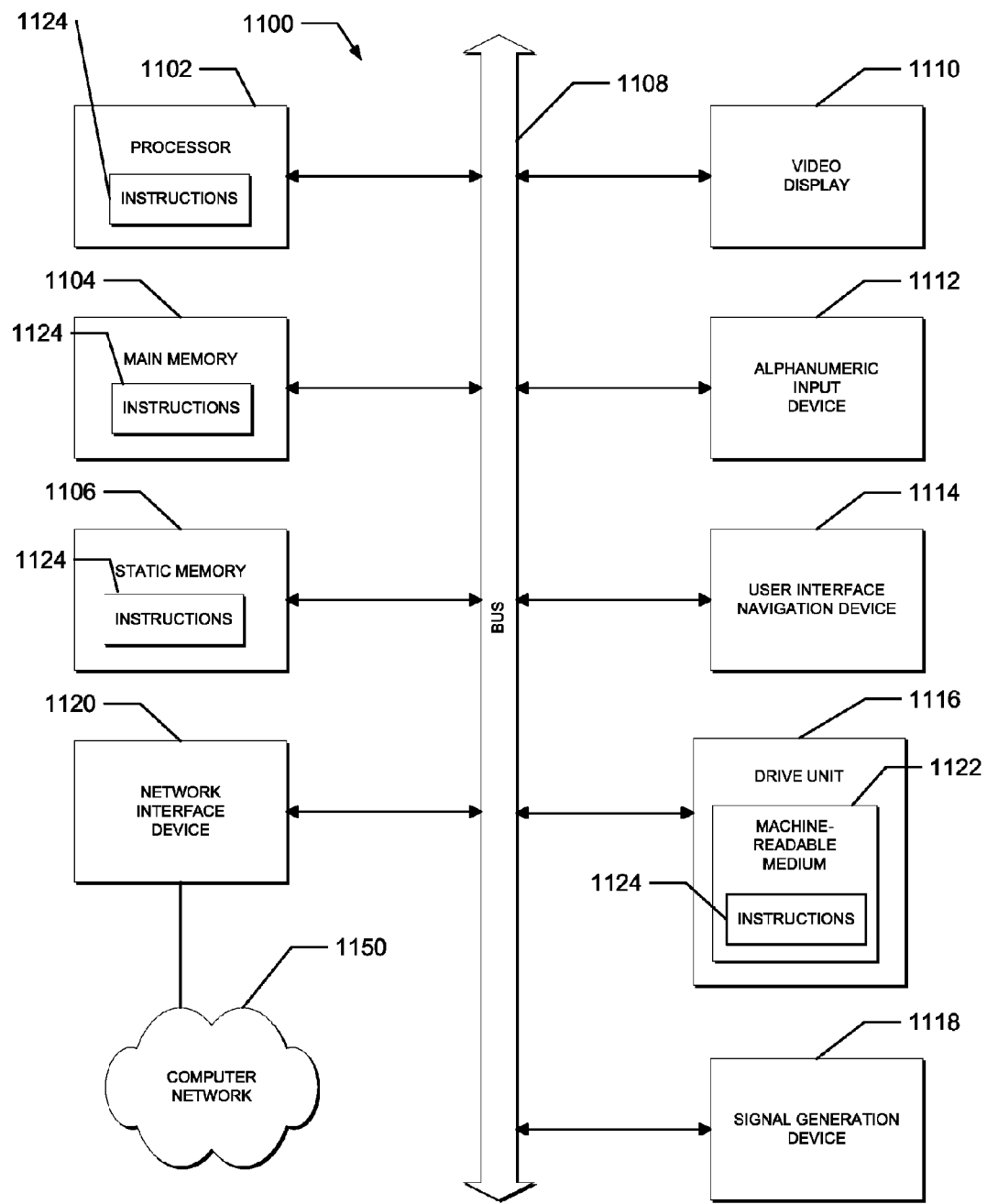
FIG. 11 depicts a hardware block diagram of a machine in the example form of a computing device within which may be executed a set of instructions for causing the machine to perform any one or more of the methodologies discussed herein.

FIG. 11 depicts a hardware block diagram of a machine in the example form of a computing device 1100 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 1100 includes a processor 1102 (e.g., a central processing unit (CPU), a graphics processing unit (GPU) or both), a main memory 1104 (e.g., random access memory), and static memory 1106 (e.g., static random-access memory), which communicate with each other via bus 1108. The computing device 1100 may further include video display unit 1110 (e.g., a plasma display, a liquid crystal display (LCD) or a cathode ray tube (CRT)). The computing device 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104 and/or within the processor 1102 during execution thereof by computing device 1100, with the main memory 1104 and processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In exemplary embodiments, one or more computer systems (e.g., the computing device 1100) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1102 configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine, but deployed across a number of machines. In some exemplary embodiments, the processors 1102 may be located in a single location (e.g., within a home environment, an office environment or as a server farm), while in other embodiments the processors 1102 may be distributed across a number of locations.

While the embodiment(s) is (are) described with reference to various implementations and exploitations, it will be understood that these embodiments are illustrative and that the scope of the embodiment(s) is not limited to them. In general, the detection and correction of corrupted or dangling data object handles may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of correcting corrupted object handles, the method being performed by a processor of a storage system and comprising:
    accessing, by the processor, a redirector file stored on a first logical data container, the redirector file including (i) forward object handle pointing to a first data object stored on a second logical data container, and (ii) a first checksum of the forward object handle;
    determining a second checksum of the forward object handle;
    comparing the first checksum with the second checksum;
    detecting a mismatch between the first checksum and the second checksum based on the comparison;
    scanning data objects stored on the second logical data container to extract backward object handles associated with the data objects;
    identifying a backward object handle, from the extracted backward object handles, that points back to the redirector file, the identified backward object handle being associated with a second data object; and
    restoring the forward object handle to point to the second data object based on the identification.

2. The method of claim 1, further comprising:
    determining a third checksum of the restored forward object handle; and
    inserting the third checksum into the redirector file that includes the restored forward object handle.

3. The method of claim 1, wherein the first checksum is a fixed-size datum computed from one or more blocks of data.

4. The method of claim 1, further comprising:
    marking the forward object handle as being corrupt based on the detection of the mismatch; and
    moving the marked forward object handle to a particular directory reserved for corrupted forward object handles.

5. The method of claim 1, wherein a pointer of the first data object points to the redirector file.

6. The method of claim 1, wherein the first logical data container includes a distributed object store that is configured to store multiple redirector files, each redirector file including a forward object handle pointing to a data object stored on one of multiple logical data containers.

7. The method of claim 1, wherein the first logical data container is not configured to store data objects.

8. A method of correcting dangling object handles, the method being performed by a processor of a storage system and comprising:
    accessing, by the processor, a redirector file stored on a first logical data container, the redirector file including (i) forward object handle pointing to a data object stored on a second logical data container, and (ii) a first checksum of the forward object handle;
    determining a second checksum of the forward object handle;
    comparing the first checksum with the second checksum;
    detecting a match between the first checksum and the second checksum based on the comparison;
    based on the match, detecting that the data object referenced by the forward object handle is not stored on the second logical data container; and
    deleting the redirector file based on the detection that the data object is not stored.

9. The method of claim 8, wherein detecting that the data object referenced by the forward object handle is not stored on the second logical data container comprises:
    accessing the data object based on the forward object handle; and
    receiving an access error.

10. The method of claim 8, wherein a pointer of the data object points to the redirector file.

11. The method of claim 8, wherein the first logical data container includes a distributed object store that is configured to store multiple redirector files, each redirector file including a forward object handle pointing to a data object stored on one of multiple logical data containers.

12. The method of claim 8, wherein the first logical data container is not configured to store data objects.

13. A non-transitory, machine-readable medium that stores instructions, which, when preformed by a machine, cause the machine to perform operations comprising:
    accessing a redirector file stored on a first logical data container, the redirector file including (i) a forward object handle pointing to a first data object stored on a second logical data container, and (ii) a first checksum of the forward object handle;
    determining a second checksum of the forward object handle;
    comparing the first checksum with the second checksum;
    detecting a mismatch between the first checksum and the second checksum based on the comparison;
    scanning data objects stored on the second logical data container to extract backward object handles associated with the data objects;
    determining whether a backward object handle, from the extracted backward object handles, points back to the redirector file; and
    if a backward object handle is identified, from the extracted backward object handles, that points back to the redirector file, the identified backward object handle being associated with a second data object, restoring the forward object handle to point to the second data object based on the identification.

14. The non-transitory, machine-readable medium of claim 13, wherein the instructions further cause the machine to perform operations comprising:
    determining a third checksum of the restored forward object handle; and inserting the third checksum into the redirector file that includes the restored forward object handle.

15. The non-transitory, machine-readable medium of claim 13, wherein the instructions further cause the machine to perform operations comprising:
if no extracted backward object handles is identified that points back to the redirector file, deleting the forward object handle based on the identification that none of the extracted backward object handles point back.

16. The non-transitory, machine-readable medium of claim 13, wherein the instructions further cause the machine to perform operations comprising:
marking the forward object handle as being corrupt based on the detection of the mismatch.

17. The non-transitory, machine-readable medium of claim 13, wherein the instructions cause the machine to restore the forward object handle by modifying the forward object handle to point to the second data object.

18. A computing device comprising:
a processor;
a memory in communication with the processor, the memory being configured to store a consistency checker module that is executable by the processor, the consistency checker module having instructions that when executed by the processor, cause operations to be performed, the operations comprising:
accessing a redirector file stored on a first logical data container, the redirector file including (i) a forward object handle pointing to a data object stored on a second logical data container, and (ii) a first checksum of the forward object handle;
determining a second checksum of the forward object handle;
comparing the first checksum with the second checksum;
detecting a match between the first checksum and the second checksum based on the comparison;
based on the match, detecting that the data object referenced by the forward object handle is not stored on the second logical data container; and
deleting the redirector file based on the detection that the data object is not stored.

19. The computing device of claim 18, wherein the instructions cause the processor to detect that the data object referenced by the forward object handle is not stored on the second logical data container by:
accessing the data object based on the forward object handle; and
receiving an access error.

20. The computing device of claim 18, wherein the first logical data container includes a distributed object store that is configured to store multiple redirector files, each redirector file including a forward object handle pointing to a data object stored on one of multiple logical data containers.

21. The computing device of claim 18, wherein the first logical data container is not configured to store data objects.

* * * * *